(12) United States Patent
Cain

(10) Patent No.: US 6,870,846 B2
(45) Date of Patent: Mar. 22, 2005

(54) HIERARCHICAL MOBILE AD-HOC NETWORK AND METHODS FOR PERFORMING REACTIVE ROUTING THEREIN USING DYNAMIC SOURCE ROUTING (DSR)

(75) Inventor: Joseph Bibb Cain, Indialantic, FL (US)

(73) Assignee: Harris Corporation, Melbourne, FL (US)

( * ) Notice: Subject to any disclaimer, the term of this patent is extended or adjusted under 35 U.S.C. 154(b) by 499 days.

(21) Appl. No.: 10/134,859

(22) Filed: Apr. 29, 2002

(65) Prior Publication Data

US 2003/0202465 A1 Oct. 30, 2003

(51) Int. Cl.$^7$ ................................................ H04Q 7/24
(52) U.S. Cl. ...................................... 370/392; 370/338
(58) Field of Search .............................. 370/254, 310, 370/338, 392, 351, 389; 709/238, 239, 242, 243

(56) References Cited

U.S. PATENT DOCUMENTS

| | | | |
|---|---|---|---|
| 5,412,654 A | 5/1995 | Perkins | 370/94.1 |
| 5,987,011 A | 11/1999 | Toh | 370/331 |
| 6,304,556 B1 | 10/2001 | Haas | 370/254 |
| 6,349,091 B1 | 2/2002 | Li | 370/238 |
| 6,385,174 B1 | 5/2002 | Li | 370/252 |
| 6,396,814 B1 | 5/2002 | Iwamura et al. | 370/256 |
| 6,456,599 B1 | 9/2002 | Elliott | 370/254 |
| 6,493,759 B1 | 12/2002 | Passman et al. | 709/227 |
| 6,535,498 B1 | 3/2003 | Larsson et al. | 370/338 |
| 2001/0033556 A1 | 10/2001 | Krishnamurthy et al. | 370/329 |
| 2002/0018448 A1 | 2/2002 | Amis et al. | 370/255 |
| 2002/0082035 A1 | 6/2002 | Aihara et al. | 455/518 |
| 2002/0101822 A1 | 8/2002 | Ayyagari et al. | 370/235 |
| 2002/0103893 A1 | 8/2002 | Frelechoux et al. | 709/223 |
| 2003/0053424 A1 | 3/2003 | Krishnamurthy et al. | 370/316 |
| 2003/0067941 A1 | 4/2003 | Fall | 370/468 |
| 2004/0003111 A1 * | 1/2004 | Maeda et al. | 709/237 |

OTHER PUBLICATIONS

Zhu, *Medium Access Control and Quality–of–Service Routing for Mobile Ad Hoc Networks*, PhD thesis, Department of Computer Engineering, University of Maryland, College Park, MD, 2001.

Mirhakkak et al., *Dynamic Quality–of–Service for Mobile Ad Hoc Networks*, MITRE Corp., 2000.

Das et al., *Routing in Ad–Hoc Networks Using Minimum Connected Dominating Sets*, IEEE Int. Conf. On Commun. (ICC '97), 1997.

Das et al., *Routing in Ad–Hoc Networks Using a Spine*, IEEE Int. Conf. On Computer Commun. and Networks (IC3N '97), 1997.

(List continued on next page.)

Primary Examiner—Chi Pham
Assistant Examiner—Derrick W Ferris
(74) Attorney, Agent, or Firm—Allen, Dyer, Doppelt, Milbrath & Gilchrist, P.A.

(57) ABSTRACT

A method is provided for sending data in a wireless ad-hoc network including a plurality of nodes grouped into clusters of nodes and a plurality of wireless links connecting the plurality of nodes, where each cluster node has a designated cluster leader node. The method may include sending a cluster-level route request from a source node of a source cluster to a cluster leader node of the source cluster, and determining a cluster-level route between the source cluster and a destination cluster including a destination node responsive to the cluster-level route request and using a plurality of the cluster leader nodes. Furthermore, at least one cluster target node may be designated in a cluster along the cluster-level route, and a node-level route determined from the source node to the destination node including the at least one cluster target node. In addition, the method may also include generating a mission data packet for transferring the data.

41 Claims, 8 Drawing Sheets

OTHER PUBLICATIONS

Raghunathan et al., *Gateway Routing: A Cluster Based Mechanism for Recovery from Mobile Host Partitioning in Cellular Networks*, Proceedings of the 3$^{rd}$ IEEE Symposium on Application–Specific Systems and Software Engineering Technology (ASSET'00), 2000.

Chen et al., *Clustering and Routing in Mobile Wireless Networks*, Nortel Networks and Computer Science, SITE, University of Ottawa, no date available.

Krishna et al., *A Cluster Based Approach for Routing in Dynamic Networks*, ACM Computer Communications Review, 27(2), Apr. 1997.

Chiang, *Routing in Clustered Multihop, Mobile Wireless Networks with Fading Channel*, Proceedings of IEEE SICON '97, Apr. 1997, pp. 36–45.

Geria, *Clustering and Routing in Large Ad Hoc Wireless Nets, Computer Science Department*, Univeristy of California, Los Angeles, Final Report 1998–99 for MICRO project 98–044.

Van Dyck et al., *Distributed Sensor Processing Over an Ad–Hoc Wireless Network: Simulation Framework And Performance Criteria*, Proceedings IEEE Milcom, Oct. 2001.

Lin et al., *Adaptive Clustering for Mobile Wireless Networks, IEEE Journal on Selected Areas in Communications*, 15(7), Sep. 1997.

McDonald, *PhD. Dissertation Proposal: A Mobility–Based Framework for Adaptive Dynamic Cluster–Based Hybrid Routing in Wireless Ad–Hoc Networks*, University of Pittsburgh, 1999.

Royer et la., *A Review of Current Routing Protocols for Ad Hoc Mobile Wireless Networks*, IEEE Personal Communications, Apr. 1999, pp. 46–55.

Corson et al., *A Reservation–Based Multicast (RBM) Routing Protocol for Mobile Networks: Initial Route Constructions Phase*, ACM/I. 1, No. 4, 1995, pp. 1–39.

Xiao et al., *A Flexible Quality of Service Model for Mobile Ad Hoc Networks, IEEE VTC2000–spring*, Tokyo, Japan, May 2000.

Wu et al., *QoS Support in Mobile Ad Hoc Networks*, Computing Science Department, University of Alberta, no date available.

Corson et al., *Mobile Ad Hoc Networking (MANET): Routing Protocol Performance Issues and Evaluation Considerations*, Network Working Group, Internet Engineering Task Force (IETF) MANET Working Group, Internet Draft, Jan. 1999.

Haas et al., *The Bordercast Resolution Protocol (BRP) for Ad Hoc Networks*, Internet Engineering Task Force (IETF) MANET Working Group, Internet Draft, Jun. 2001.

Haas et al., *The Interzone Routing Protocol (IERP) for Ad Hoc Networks*, Internet Engineering Task Force (IETF) MANET Working Group, Internet Draft, Jun. 2001.

Haas et al., *The Intrazone Routing Protocol (IERP) for Ad Hoc Networks*, Internet Engineering Task Force (IETF) MANET Working Group, Internet Draft, Jun. 2001.

Clausen et al., *Optimized Link State Routing Protocol*, Internet Engineering Task Force (IETF) MANET Working Group, Internet Draft, Oct. 31, 2001.

Perkins et al., *Quality of Service in Ad hoc On–Demand Distance Vector Routing*, Internet Engineering Task Force (IETF) MANET Working Group, Internet Draft, Jul. 2000.

Park et al., *Temporally–Ordered Routing Algorithm (TORA) Versoin 1 Functional Specification*, Internet Engineering Task Force (IETF) MANET Working Group, Internet Draft, Jul. 20, 2001.

Ogier et al., *Topology Broadcast Based on Reserve–Path Forwarding (TBRPF)*, Internet Engineering Task Force (IETF) MANET Working Group, Internet Draft, Jan. 10, 2002.

Gerla et al., *Landmark Routing Protocol (LANMAR) for Large Scale Ad Hoc Networks*, Internet Engineering Task Force (IETF) MANET Working Group, Internet Draft, Dec. 17, 2001.

Hu et al., *Flow State in the Dynamic Socurce Routing Protocol for Mobile Ad Hoc Networks*, Internet Engineering Task Force (IETF) MANET Working Group, Internet Draft, Feb. 23, 2001.

Gerla et al., *Fisheye State Routing Protocol (FSR) for Ad Hoc Networks*, Internet Engineering Task Force (IETF) MANET Working Group, Internet Draft, Dec. 17, 2001.

Johnson et al., *The Dynamic Source Routing Protocol for Mobile Ad Hoc Networks (DSR)*, Internet Engineering Task Force (IETF) MANET Working Group, Internet Draft, Nov. 21, 2001.

Perkins et al., *Ad hoc On–Demand Distance Vector (ADOV) Routing*, Internet Engineering Task Force (IETF) MANET Working Group, Internet Draft, Nov. 9, 2001.

Jin et al., *A Hierarchical Routing Protocol for Large Scale Ad Hoc Network* IEEE 1999, pp. 379–385.

Gerla et al., *Multicluster, Mobile, Multimedia Radio Network*, Wireless Networks I, 1995, pp. 255–265.

Azzidine Boukerche, "A Simulation Based Study of On–Demand Routing Protocols for Ad hoc Wireless Networks", IEEE 2001, pp. 85–92.

Jiang et al., "Cluster Based Routing Protocol (CBRP)", Internet Draft draft–letf–manet–cbrp–spec–01.txt. Aug. 14, 1999, pp. 1–27.

Chakrabarti et al., "*QoS Issues in Ad Hoc Wireless Networks*", , IEEE Communications Magazine, (2/01), pp. 142–148.

Chen, "*Routing Support for Providing Guaranteed End–to–End Quality–of–Service*," Ph.D. thesis, Univ. of Illinois at Urbana–Champaign, http://cairo.cs.uiuc.edu/papers/Scthesis.ps. 1999.

* cited by examiner

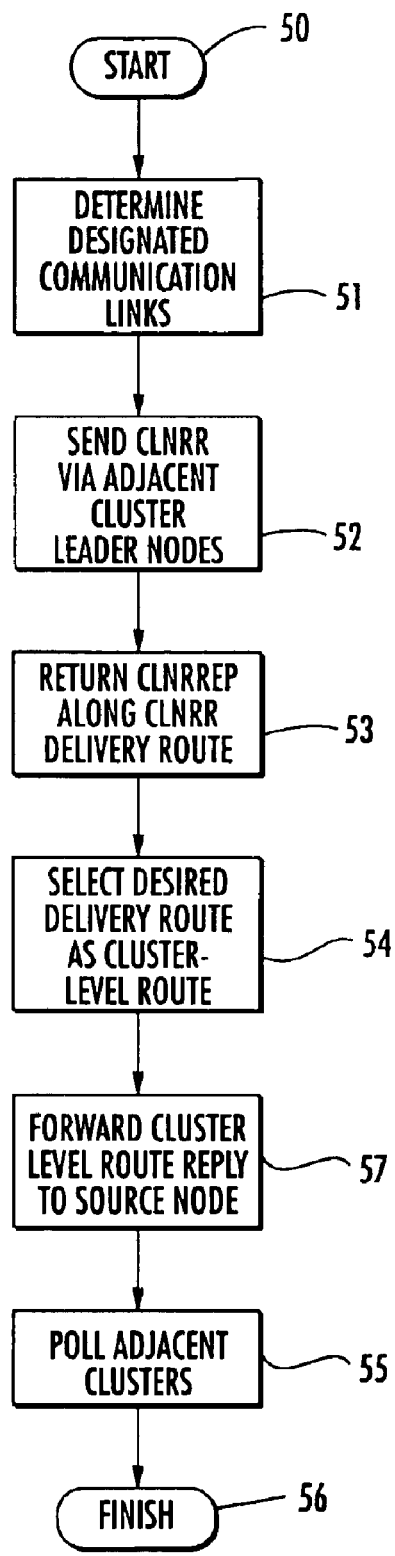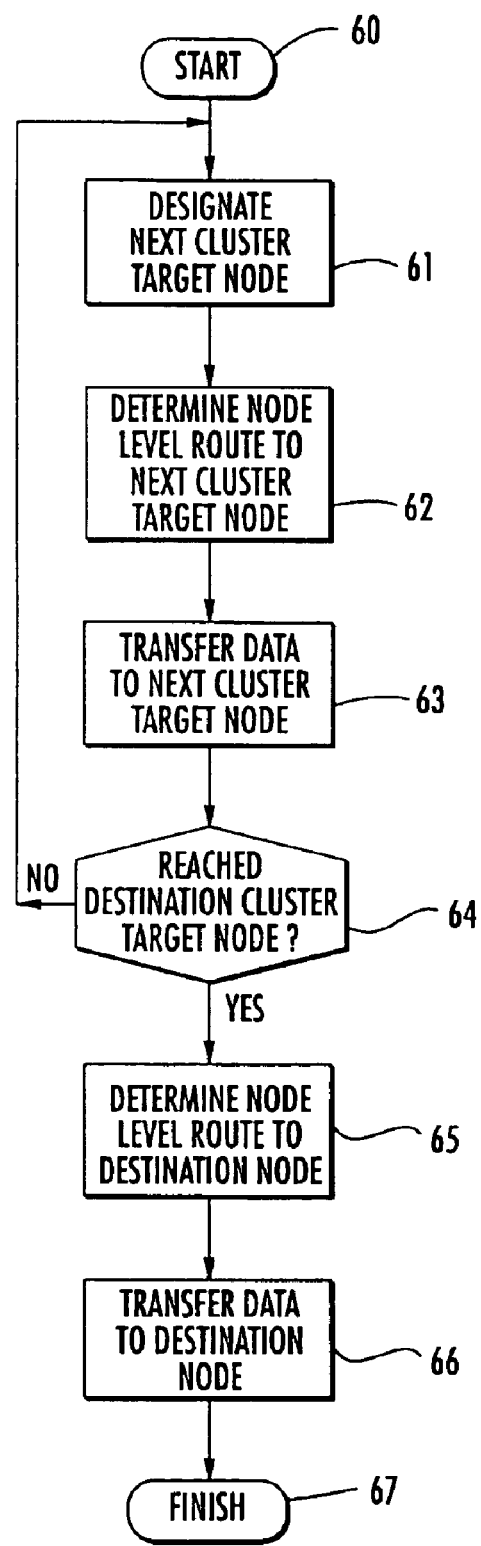
FIG. 5.
FIG. 6.

HIERARCHICAL MOBILE AD-HOC NETWORK AND METHODS FOR PERFORMING REACTIVE ROUTING THEREIN USING DYNAMIC SOURCE ROUTING (DSR)

FIELD OF THE INVENTION

The present invention relates to the field of communication networks, and, more particularly, to mobile ad-hoc wireless networks and related methods.

BACKGROUND OF THE INVENTION

Wireless networks have experienced increased development in the past decade. One of the most rapidly developing areas is mobile ad-hoc networks. Physically, a mobile ad-hoc network includes a number of geographically-distributed, potentially mobile nodes sharing a common radio channel. Compared with other types of networks, such as cellular networks or satellite networks, the most distinctive feature of mobile ad-hoc networks is the lack of any fixed infrastructure. The network may be formed of mobile nodes only, and a network is created "on the fly" as the nodes transmit with each other. The network does not depend on a particular node and dynamically adjusts as some nodes join or others leave the network.

Because of these unique characteristics, routing protocols for governing data flow within ad-hoc networks are required which can adapt to frequent topology changes. Two basic categories of ad-hoc routing protocols have emerged in recent years, namely reactive or "on-demand" protocols, and proactive or table-driven protocols. Reactive protocols collect routing information when a particular route is required to a destination in response to a route request. Examples of reactive protocols include ad-hoc on demand distance vector (AODV) routing, dynamic source routing (DSR), and the temporally ordered routing algorithm (TORA).

On the other hand, proactive routing protocols attempt to maintain consistent, up-to-date routing information from each node to every other node in the network. Such protocols typically require each node to maintain one or more tables to store routing information, and they respond to changes in network topology by propagating updates throughout the network to maintain a consistent view of the network. Examples of such proactive routing protocols include destination-sequenced distance-vector (DSDV) routing, which is disclosed in U.S. Pat. No. 5,412,654 to Perkins; the wireless routing protocol (WRP); and cluster-head gateway switch routing (CGSR). A hybrid protocol which uses both proactive and reactive approaches is the zone routing protocol (ZRP), which is disclosed in U.S. Pat. No. 6,304,556 to Haas.

One challenge to the advancement of ad-hoc network development is that of extending such networks to encompass large numbers of nodes. One prior art attempt to do so utilizes "spine" routing, such as in the optimal spine routing (OSR) approach disclosed by Das et al. in "Routing in Ad-Hoc Networks using Minimum Connected Dominating Sets," *IEEE Int. Conf. On Commun.* (ICC '97), 1997. In this approach, a spine or "virtual backbone" is defined such that each network node is no more than one hop from a spine node. Global topology (link state) is maintained at each spine node, and a link-state routing algorithm is run at each spine node to produce current routes to every destination.

Another related approach is clustered spine routing (CSR), which is disclosed by Das et al. in "Routing in Ad-Hoc Networks using a Spine," *IEEE Int. Conf. On Computer Commun. and Networks* (IC3N '97), 1997. this approach is intended to extend the applicability of spine routing to larger network sizes by grouping the nodes in clusters and adding a second hierarchical level to the OSR approach. Yet another approach is known as partial knowledge spine routing (PSR) which is disclosed by Sivakumar et al. in "The Clade Vertebrata: Spines and Routing in Ad-Hoc Networks," *IEEE Symposium On Computer and Commun.*, 1998.

One common characteristic of each of the above prior art cluster/spine approaches is that they each rely on proactive routing. One potential drawback of proactive routing is that it typically requires a significant amount of routing overhead to maintain optimal routes to all destinations at all times. This problem may become particularly acute when applied to ad-hoc networks including a very large number of nodes.

SUMMARY OF THE INVENTION

In view of the foregoing background, it is therefore an object of the present invention to provide a method for sending data in ad-hoc networks that is particularly well suited for networks having a relatively large number of nodes.

This and other objects, features, and advantages in accordance with the present invention are provided by a method for sending data in a wireless ad-hoc network including a plurality of nodes grouped into clusters of nodes and a plurality of wireless links connecting the plurality of nodes, where each cluster has a designated cluster leader node. The method may include sending a cluster-level route request from a source node of a source cluster to a cluster leader node of the source cluster, and determining a cluster-level route between the source cluster and a destination cluster including a destination node responsive to the cluster-level route request and using a plurality of the cluster leader nodes. Furthermore, at least one cluster target node may be designated in a cluster along the cluster-level route, and a node-level route determined from the source node to the destination node including the at least one cluster target node. In addition, the method may also include generating a mission data packet including an address of the destination node, an address of the at least one cluster target node, the node-level route, and the cluster-level route. The data may be transferred from the source node to the destination node via the node-level route based upon the mission data packet.

More particularly, determining the at least one cluster target node may include determining a respective cluster target node for each cluster along the cluster-level route. Further, determining the node-level route may include determining the node-level route from the source node to a cluster target node for a next adjacent cluster along the cluster-level route, and a node-level route may be determined from each cluster target node to a next cluster target node along the cluster-level route. Also, generating the mission data packet may further include updating the mission data packet at each cluster target node along the cluster-level route to include an address of the next cluster target node and the node-level route thereto.

The address of the at least one cluster target node and the cluster-level route may be equal to a predetermined value if the source cluster and the destination cluster are the same cluster. The method may further include storing the address of the destination node along with an address of the respective cluster leader node therefor at the cluster leader node for the source cluster. Also, a hierarchical source route may be stored, at the source node, to the destination node. The hierarchical source route may include the cluster-level route, the address of the at least one cluster target node, and the node-level route. Additionally, the cluster-level route may be stored at the cluster leader node for the source cluster.

Furthermore, the method may also include grouping a plurality of the cluster leader nodes including at least the source cluster leader node and the destination cluster leader node into a leader node cluster. A high-level route may be determined from the cluster leader node of the source cluster to the cluster leader node of the destination cluster within the leader node cluster. Also, the cluster-level route may include at least the clusters having respective cluster leader nodes along the high-level route.

Determining the cluster-level route may include determining designated communication links between the cluster leader nodes, and sending a cluster leader node route request from the cluster leader node of the source cluster to the remaining cluster leaders via the designated communication links. Further, a cluster leader node route reply may be returned from the cluster leader node of the destination cluster to the cluster leader node of the source cluster along a delivery route of the cluster leader node route request.

More particularly, at least one of the designated communications links may include a node that is not a cluster leader node. Further, each cluster leader node may store identities of adjacent cluster leader nodes, and sending the cluster leader node route request may include sending the cluster leader node route request from each cluster leader node to its adjacent cluster leader nodes. Also, the adjacent cluster leader nodes may be periodically polled to maintain current addresses therefor. Furthermore, the delivery route may include a least number of cluster leader nodes between the cluster leader nodes of the source and destination clusters. Other path metrics such as delay, link capacities, availability, etc., may also be useful in determining the best route.

A mobile ad-hoc network is also provided according to the present invention and may include a plurality of nodes grouped into clusters of nodes, each cluster having a designated cluster leader node, and a plurality of wireless links connecting said plurality of nodes. The plurality of nodes may send data therebetween as briefly outlined above.

BRIEF DESCRIPTION OF THE DRAWINGS

FIG. 5 is a flow diagram illustrating the cluster-level route discovery process of FIG. 5 in further detail.

FIG. 6 is a flow diagram illustrating the node-level route discovery process and data transfer of FIG. 5 in further detail.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation is used to indicate similar elements in alternative embodiments.

Figure 1:
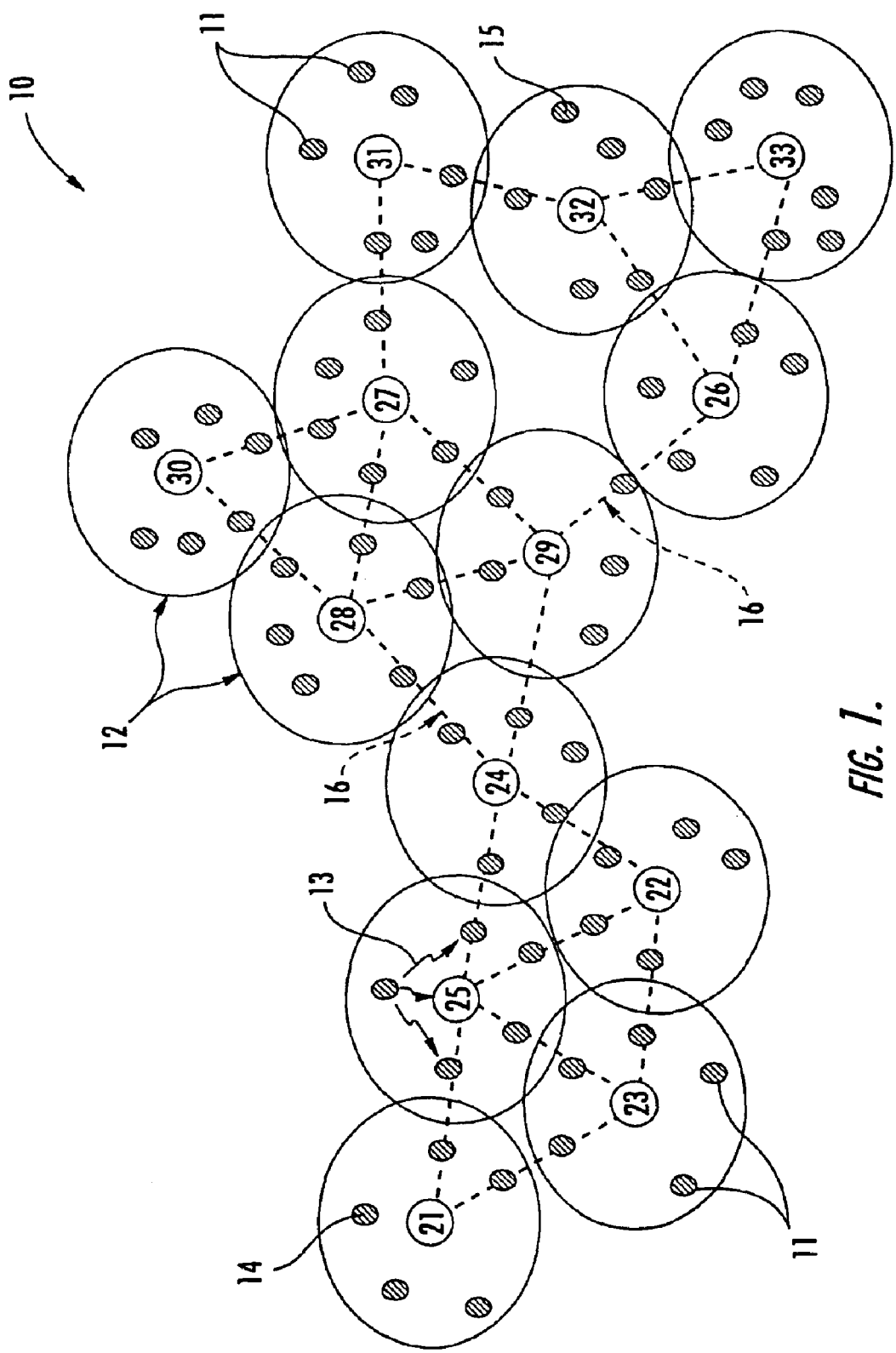
FIG. 1 is a schematic diagram of an ad-hoc network according to the present invention.

Referring initially to FIG. 1, a mobile ad-hoc network 10 according to the present invention illustratively includes a plurality of nodes 11 connected by wireless communications links 13. The nodes 11 may be any suitable type of wireless communications device capable of communicating within a wireless ad-hoc network, such as computers, personal data assistants (PDAs), etc. with wireless modems, as well as others, as will be appreciated by those of skill in the art. Of course, it will also be appreciated that certain of the nodes 11 may optionally be connected to a fixed communications infrastructure, if desired.

According to the invention, the nodes 11 are preferably grouped into clusters 12, which are illustratively shown as circles surrounding respective groups of nodes in FIG. 1. Grouping of the nodes 11 into clusters 12 will be described in greater detail below. For each of the clusters 12, one of the nodes 11 thereof is designated as a respective cluster leader node 21–33. The process for designating the cluster leader nodes 21–33 and the function thereof will also be described further below. For clarity of explanation, when a cluster 12 is discussed individually herein, the particular cluster will be referred to by the reference numeral of its respective cluster leader node. For example, the cluster leader node 21 is within the cluster 21, etc.

A method for sending data within the ad-hoc network 10 according to the invention will now be described with reference to the flow diagrams of FIGS. 4–6. The method beings (Block 40) by grouping the nodes 11 into the clusters 12, at Block 41. Various approaches may be used for grouping the nodes 11 in the clusters 12. Generally speaking, it is preferable that decisions for clustering and election of cluster leaders be based upon a generalized metric with parameters selected to meet specific network requirements, as will be appreciated by those skilled in the art.

By way of example, a node 11 may select a cluster 12 to join based upon a cluster association metric. This metric may be calculated for each of the potential clusters 12 that a node 11 may associate with, and it may be based upon how well the node "fits" with the cluster in question. The cluster association metric can be as simple as a hop count metric, where the hop count is calculated for the path to the cluster leader node. In this simple case a node would associate with the cluster leader node that is closest in hop count.

Other metrics may consider different measures such as the path metric to all cluster members within $k_N$ hops, the number of cluster members within $k_N$ hops, the path metric to the cluster leader, and/or the cluster leader metric, for example. There are several methods possible for combining these measures to create a unified metric for cluster association. One example is a weighted sum where a node calculates the metric $$M_m^{CA}$$

for associating with cluster leader node m as:

$$M_m^{CA} = M_m^{CL} + a \cdot M_m^{PCL} + \frac{c}{(n_m)^b} \cdot \sum_i M_i^P, \quad (1)$$

where $n_m$ is the number of nodes within a $k_N$-hop neighborhood that are in cluster m, $M_i^P$ is the path metric to the $i^{th}$ node in that neighborhood, $$M_i^{PCL}$$

is the path metric to the cluster leader node m, $$M_m^{CL}$$

is the cluster leader metric, and a, b, and c are parameters to be tailored to the network requirements. Of course, other suitable approaches may also be used, as will be appreciated by those of skill in the art.

The above parameters allow a compromise in the association between selecting the cluster leader node 21–33 with the minimum path metric versus selecting the cluster 12 with a minimum path metric to as many nodes 11 in the cluster as possible. The node 11 selects the cluster leader node 21–33 with which it has the smallest cluster association metric $$M_m^{CA}$$

as the leader to join. In addition, a hop count limit may be established that requires a new cluster member to be within hops $k_C$ of the cluster leader node, as well as a limit $L_{CL}$ on the number of nodes per cluster.

Path metrics used in the above calculation may include as node or link metrics one or more components such as hop count, delay, available capacity, node durability, and/or link durability, for example, although other suitable methods may also be used, as will be appreciated by those of skill in the art. A path metric may also be calculated as a weighted sum of link and node metric components along the path.

If the above cluster association metric is not within certain bounds, then a node 11 may elect to attempt to become a cluster leader node and form a new cluster 12, at Block 42. In doing this it may contend with its $k_N$-hop neighbors for the election to cluster leader. Another metric, the cluster leader metric, may be used for this purpose. Generally speaking, the cluster leader metric is based upon how well the node 11 will perform the task of cluster leader node for its $k_N$-hop neighbors.

More specifically, the cluster leader metric may take one of several forms. It could be as simple as the number of nodes reachable in a $k_N$-hop neighborhood. However, additional components for the metric may be desirable in certain applications. The cluster leader should preferably be "durable" in terms of its operation as a cluster leader, i.e., rather than intermittently alternating between powered-up and sleeping modes. An intermittently operating cluster leader node 21–33 would likely cause disruptive dynamics in the hierarchical topology, as will be appreciated by those of skill in the art.

Thus, nodes 11 contending to be a cluster leader may calculate their cluster leader metric $$M_m^{CL}$$

using one or more of components, such as the number of nodes reachable in a $k_N$-hop neighborhood, path metrics to these nodes, path metrics to neighbor cluster leader nodes 21–33, total nodal link capacities, node durability, and node relative mobility, for example. Of course, other metric components which will be appreciated by those of skill in the art may also be used. For a given network application, the cluster leader metric can be formed as an appropriate combination of those components which are needed for that application in a manner similar to that illustrated in equation (1), above, for the cluster association metric, as will also be appreciated by those skilled in the art.

As will be discussed further below, each cluster leader node 21–33 broadcasts a cluster leader node announce (CLNANN) message periodically (with a propagation limit of $n_{CL}$ hops, for example). The propagation limit of this message may be such that it can reach all cluster members as well as the cluster leader nodes of all adjacent clusters. This message will announce the node as a cluster leader node and include the cluster leader metric for that node. In addition, it may include placeholders to allow accumulation of a path metric for any path over which it is propagated, as will be appreciated by those of skill in the art.

Several forms of the path metric are possible, and the path metric can be either accumulated as one or more components or as a vector with each node retransmitting the CLNANN message and adding its contribution to the vector metric, as will be appreciated by those of skill in the art. The path metric and the cluster leader metric allow any node to calculate a cluster association metric. It will also be appreciated that the procedures for joining or associating with a cluster and the procedures for electing a cluster leader node, although described separately herein for clarity of explanation, may in fact be so closely related that in some embodiments they are implemented in a single composite algorithm.

Operational details of cluster association and election of cluster leader nodes will now be discussed further with reference to FIG. 10, in which a scenario for the election of a new cluster leader node is schematically illustrated. Clusters 101 and 102 include designated cluster leader nodes 101 and 102, respectively. For clarity of illustration and explanation, the same reference numeral used for a particular cluster leader node will also be used to designate its respective cluster. Using the example illustrated in FIG. 10, the operational details associated with periodic messaging, node power-up election and cluster association, cluster leader node election, link failure, node failure, and new link addition will now be discussed.

With respect to periodic messaging, two types of periodic messages may be used. The cluster leader nodes 101, 102 issue periodic CLNANN messages, as briefly discussed above. This message announces the existence of the node as a cluster leader node. It is propagated for $n_{CL}$ hops so that it reaches all nodes 11 in adjacent clusters and, more particularly, the adjacent cluster leader nodes. This message may include the cluster leader metric and a placeholder for nodes re-broadcasting the message to accumulate a path metric for the path from the cluster leader node to any node along each of the paths traversed.

The cluster leader metric may also be used to notify other nodes in the cluster of this metric. This is so that any other node that can be a better cluster leader can determine if it should contend for leadership based upon this metric. Each ordinary node 11 may also broadcast a neighborhood HELLO message that is to be propagated for $k_N$ hops so that it reaches all nodes in a $k_N$-hop neighborhood of the node. This allows all nodes in the $k_N$-hop neighborhood to gather path metric information to all nodes in their neighborhood. The path metrics obtained in this manner can be used in forming both cluster leader and cluster association metrics.

Regarding node power-up and cluster association, upon powering up a node 11 may perform the following steps. The node 11 may "listen" for the periodic CLNANN messages from cluster leader nodes in neighboring clusters to identify potential clusters that it may join. Further, it may listen for the periodic HELLO messages from nodes 11 in the $k_N$-hop neighborhood to gather path metric information to all nodes in its $k_N$-hop neighborhood. Additionally, it may broadcast periodic HELLO messages to all nodes in its $k_N$-hop neighborhood. A cluster association metric $$M_m^{CA}$$

may then be formed for each adjacent cluster leader m and the cluster leader node m, may be selected with the minimum cluster association metric $$M_m^{CA}$$

as the cluster to join.

The metric $$M_m^{CA}$$

will preferably be less than a threshold $T_J$ to indicate that the node to be considered is close enough to the cluster to join. If this threshold is satisfied, then a cluster join message CLJOIN is sent to the cluster leader node m. If the cluster has less than the limit $L_{CL}$ on the number of nodes per cluster, then the cluster leader node accepts the node in the cluster and sends the acceptance message CLACCEPT to the node. If the cluster leader node cannot accept another member, then it sends a reject message CLREJECT to the node. Additionally, if the node is rejected, it may then select the next best cluster leader node as its backup and repeat the process to join that cluster.

A node 11 following the above processes will ordinarily become a member of a cluster 12 soon after powering up. In some cases, such as network initiation, for example, it will find no acceptable cluster leader node 21–33 with which to complete the association. In this case the node 11 may decide to contend to become a cluster leader node.

If an ordinary node 103 decides to contend to become a cluster leader node, it may initiate the following procedures. The node 103 may broadcast a special type of CLNANN message to all nodes 11 in its $k_N$-hop neighborhood that announces its bid to become a cluster leader node, which this includes the cluster leader metric calculated by the node. For reliability purposes, each node 11 in the $k_N$-hop neighborhood will preferably respond to the CLNANN message. Any node 11 that does not respond may be sent a follow-up CLNANN message via unicast, for example, as will be understood by those of skill in the art.

A node 11 responding positively to the CLNANN message returns a CLNANN message indicating agreement that the node 103 can become a cluster leader node. It does this either because it is not in a position to become a cluster leader node itself or it has a larger cluster leader metric than that received in the original CLNANN message. A node 11 responding negatively to the CLNANN message returns a CLNANN message that announces that it has a better cluster leader metric than that received in the original CLNANN message and that it will make a better cluster leader. In the event of a cluster leader metric tie, the cluster leadership role may be aarded to the node with the lowest node ID, for example, though other tiebreakers may also be used.

If all CLNANN message responses are positive, or if there is contention but the node 103 wins the cluster leader node role, then the node assumes the cluster leader node role. It then begins the periodic broadcast of regular CLNANN messages to be propagated for $n_{CL}$ hops to reach all nodes 11 in adjacent clusters 12 and the adjacent cluster leader nodes. Other nodes 11 may now begin to consider if they should join this new cluster. Yet, if another node wins the indicating agreement node role, then the node 103 will consider if it should join the cluster of this new cluster leader node.

Link/node failures and route recoveries will be discussed in further detail below, but a brief discussion is appropriate at this point in the context of clustering and cluster leader node designation. More specifically, when a node 11 loses a link to a neighboring node, it may perform certain actions. That is, it may test its path to its cluster leader node to determine if it can remain in the same cluster. If it cannot find a node level route to the cluster leader node, it may then associate with another cluster leader node. On the other hand, if the node 11 determines it still has a path to the cluster leader node, it may then reevaluate the cluster association metrics to this cluster leader node and to the cluster leader nodes for adjacent clusters.

If the cluster association metric has increased to a value above another threshold $T_L$, i.e., $$M_m^{CA} > T_L > T_J,$$

then it will preferably leave the cluster and possibly find an adjacent cluster for which its cluster association metric meets the criteria for joining, as previously described above. Also, the node 11 may find that it has a better cluster association metric than an adjacent cluster leader node. If its current association is with cluster leader node m and its best adjacent cluster leader node is node k, then if node k has a cluster association metric that is better by a specified threshold the node may associate with the adjacent cluster. That is, if $$M_m^{CA} - M_k^{CA} > \Delta_{CL},$$

then it switches from cluster m to cluster k. In several cases, a node may find that it should attempt to form a new cluster and contend for cluster leadership using the procedures defined above, as will be appreciated by those of skill in the art.

With respect to node failure, either an ordinary node or a cluster leader node 21–33 may experience a failure or shut down. The failure of an ordinary node (i.e., a node other then a cluster leader node 21–33) may equate to potentially several link failures as detected by the neighbors of the node. These nodes may each respond to this failure as if it were a link failure and proceed according to the procedures defined above. Another type of failure that is potentially more disruptive is a failure of a cluster leader node. This failure may be detected by neighboring nodes by the link loss, and by other nodes in the cluster by the loss of the periodic CLNANN message broadcasts. Nodes in the same cluster may select an adjacent cluster leader with which they can associate if the cluster association metric is good enough using the procedures defined above, for example. Alternatively, one or more nodes may contend to become a cluster leader node 21–23 using the cluster leader election procedures defined above.

In addition to the topology dynamics induced by the node and link failures discussed above, link additions may also induce topology changes. Link and node failures tend to make nodes 11 become further away topologically. Conversely, link additions tend to make nodes 11 become closer together topologically, thereby improving the path metrics. Traffic dynamics can have a similar effect. This can have the effect of making nodes in one cluster eventually have a better cluster association metric with an adjacent cluster. The node 11 can use the same procedures defined above to determine if it should switch its cluster association, as will be understood by those skilled in the art. If the current association of the node is with cluster leader node m and its best adjacent cluster leader node is node k, then if node k has a cluster association metric that is better by a specified threshold, the node may associate with the adjacent cluster. That is, if $$M_m^{CA} - M_k^{CA} > \Delta_{CL},$$

then it switches from cluster m to cluster k.

Further, two cluster leader nodes may become very close to each other, making elimination of one of the cluster leader nodes a desirable outcome. If the path metric between two cluster leader nodes becomes less than a specified threshold value $\Delta_P$, and if one of them can support the total number of cluster members for both clusters, then the best cluster leader node may be determined and the other node may relinquish its cluster leader node role. As cluster leader nodes move closer together, the ordinary nodes may use the cluster association metrics to naturally migrate to the best choice for them as the cluster leader node. Thus, the decision of which of the two nodes should be the remaining cluster leader node will be based upon the number of cluster members for each node and its cluster leader metric. After one of the nodes relinquishes it cluster leader node role, the ordinary nodes associated with it may choose to associate either with the remaining cluster leader node or any of their other adjacent cluster leader nodes.

When a particular source node 14 in a source cluster (in the illustrated example of FIG. 1, the cluster 21) needs to send data to a destination node 15 in a destination cluster (here, the cluster 32), the source node may advantageously send a cluster-level route request (CLRR) to its respective cluster leader node (here, the node 21), at Block 43. The source cluster 21 then begins the process of determining a cluster-level route between the source cluster 21 and a destination cluster 32 responsive to the cluster-level route request, at Block 44. That is, the cluster level route is established in a reactive fashion, as opposed to the proactive approaches used for spine/cluster routing of the prior art.

A cluster-level route is a particular sequence of clusters 12 in a route from the source cluster to the destination cluster. Referring more particularly to FIG. 5, the determination of the cluster-level route will now be described in further detail. This process begins (Block 50) with determining (or establishing) designated communication links 16 between the cluster leader nodes 21–33, at Block 51. The designated communication links 16 are illustratively shown as dotted lines in FIG. 1 and may be conceptually thought of as "virtual" links between the cluster leader nodes 21–33. Each designated communication link may include a single-hop or multi-hop path that connects the cluster leader nodes 21–33 in adjacent clusters 12. That is, each of the designated links may include one or more intermediate nodes 11 which are not cluster leader nodes 21–33, or there may be no such intermediate nodes therebetween.

The determination of the designated links 16 may include sending a cluster leader node announce (CLNANN) message via limited broadcast by a cluster leader node to announce to all adjacent clusters that it is a cluster leader node for a designated cluster. As used herein, "adjacent clusters" are two clusters 12 for which at least one node 11 in one of the clusters is directly connected to at least one node in the other cluster.

Once a cluster leader node 21–33 knows that another cluster leader node is present in an adjacent cluster, it obtains a node–level route to that cluster leader node (i.e., the designated communication link 16 between the cluster leader nodes). These two cluster leader nodes maintain the designated communication links 16 therebetween and a metric associated therewith. This metric may include a number of hops in the designated communication link 16, quality of service (QoS) parameters such as bandwidth, availability, etc., as will be appreciated by those of skill in the art. Such metrics may also preferably be used for the other designated links 16 as well.

Each cluster leader node preferably stores the addresses of all of its adjacent cluster leader nodes and maintains designated communications links 16 to each of the adjacent cluster leader nodes. Once the designated communications links are established, if the cluster-level route requested by the source node 14 is not to one of the clusters adjacent to the source cluster, then the source cluster leader node 21 may begin the cluster-level route discovery process.

The process is initiated by sending a cluster leader node route request (CLNRR) from the cluster leader node 21 of the source cluster to the remaining cluster leader nodes 22–31 via the designated communication links 16, at Block 52. More particularly, this may be done by sending the cluster leader node route request from the source cluster leader node 21 to each of its adjacent cluster leader nodes, which are the cluster nodes 23, 25 in the example illustrated in FIG. 1. The cluster leader nodes 23, 25 then, in turn, forward the cluster leader node route request to each of its adjacent cluster leader nodes, and so on, until the request has been received by all of the cluster leader nodes 21–33.

It will be appreciated by those of skill in the art that above approach provides significant savings in overhead traffic since no global broadcast is used. That is, only a subset of wireless links 13 are required for the broadcast. An expanding ring search can be used in this process in order to further limit the communications overhead transmissions required. Further, the cluster leader node route request can be targeted to discover a route to a single cluster, to a list of clusters, or to all clusters. The cluster leader node route request may also include an accumulated metric that can indicate the desirability of each cluster-level route found. By way of example, the accumulated metric may be the accumulation of link metrics for the designated communication links 16 between the cluster leader nodes 21–33 along the route to the targeted destination cluster 32.

When a cluster leader node route request is received by the destination cluster leader node 32, the destination cluster leader node replies with a cluster leader node route reply (CLRREP), at Block 53. This cluster leader node route reply is used by the destination cluster leader node 32 to return the cluster-level route to the source cluster leader node 21. This message is returned via the delivery route which the cluster leader node route request traveled, i.e., the designated communication links 16 connecting the source cluster leader node 21 and destination cluster leader node 32.

The information in the cluster leader node route reply may include the sequence of clusters on the delivery route, though other variations are possible, as will be discussed further below. In addition, a path metric (or components that can be combined to form a path metric) for the particular delivery route may be returned. Of course, it is possible that the destination cluster leader node 32 may receive the same cluster leader node route request message from more than one of its adjacent cluster leader nodes (i.e., the cluster leader nodes 26, 31, and 33 in the example illustrated in FIG. 1). In such case, the destination cluster leader node 32 may also return cluster leader node route replies for each of the delivery routes associated with each of these adjacent cluster leader nodes.

Once the source cluster leader node 21 collects all of the cluster leader node route replies corresponding to a given cluster leader node route request, it may then use the path metric of each delivery route to select the best route from among the delivery routes as the cluster-level route, at Block 54. Of course, in some embodiments the destination node 15 could select the best delivery route from among those available and only return the cluster leader node route reply along the best path to thereby determine the cluster-level route.

In either event, once selected the best route may then be stored in a routing cache or table. By way of example, the path metric used to select the cluster-level route may be which delivery route includes the least number of cluster leader nodes (i.e., which one has includes the least number of clusters 12). Of course, other metrics, such as the QoS metrics noted above, may also be used. One particularly advantageous approach to selecting routes using QoS parameters is described in a co-pending U.S. application entitled "METHODS AND SYSTEM FOR DETERMINING QUALITY OF SERVICE (QoS) ROUTING FOR MOBILE AD HOC NETWORKS," attorney docket number GCSD-1201 (51264), filed Apr. 29, 2002, which is assigned to the present assignee and is incorporated herein in its entirety by reference. Once the source cluster leader node 21 has determined the best cluster level route, it may then be forwarded to the requesting source node 14 in a cluster level route reply (CLRREP) message, at Block 57.

Each of the cluster leader nodes 21–33 may periodically poll its adjacent cluster leader nodes to maintain current addresses therefor, at Block 55, illustratively concluding the method (Block 56). This may advantageously expedite the process of forwarding the cluster level node route requests since adjacent cluster leader nodes will not have to be determined with each new request. While this polling step is illustratively shown as a final step (Block 55) in the cluster-level route discovery process illustrated in FIG. 5, it will be understood that this step may be performed at any time after the designated communication links 16 between adjacent cluster leader nodes 21–33 are established and at any desired interval.

Figure 4:
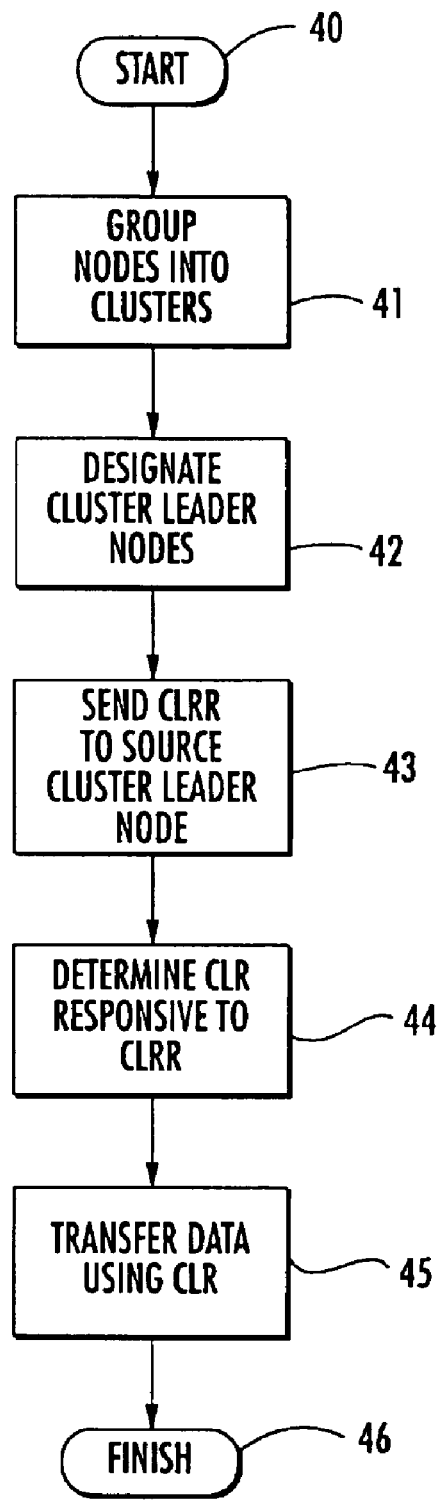
FIG. 4 is a flow diagram illustrating a method for sending data within an ad-hoc network according to the present invention.

Once the cluster-level route is established, data may be transferred from the source node 14 to the destination node 15 using the cluster-level route, at Block 45, thus ending the method illustrated in FIG. 4 (Block 46). The process of transferring the data using the cluster-level route will now be described with reference to the schematic diagram of the ad-hoc network 10 illustrated in FIG. 2, in which the designated communication links 16 have been removed for clarity of illustration, and the flow diagram of FIG. 6. For this example, it will be assumed that the cluster-level route selected by the source node 14 includes clusters 21 (source), 25, 24, 29, 26, and 32 (destination).

This process begins (Block 60) by designating a cluster target node 17 in a next cluster along the cluster-level route to which the data is to be sent, at Block 61. While it is not necessary to use cluster target nodes for transferring data according to the present invention, the cluster target nodes provide a convenient point of entry into each cluster along the cluster-level route and thereby facilitate establishing node-level routes therebetween, as will be described further below.

More particularly, the source node 14 will select a cluster target node 17a in the next adjacent cluster along the cluster-level route (here, the cluster 25). This may be done by broadcasting an adjacent cluster target node discovery packet using an expanding ring search to identify potential cluster target nodes, for example. This broadcast may advantageously be limited to the next adjacent cluster (here, the cluster 25). Thus, the broadcast is of limited extent to reduce excess traffic in the ad-hoc network 10.

Any node in the adjacent cluster 25 will send back an adjacent cluster target node discovery response packet that allows the source node 14 to collect the identity of the potential cluster target node along with a metric and a route thereto. An algorithm may be used for selecting the best adjacent cluster target node in the adjacent cluster 25 based upon all of the adjacent cluster target node discovery responses received and based upon the metrics included therewith. Here again, the path metrics used may include the least number of hops, QoS parameters, etc., as similarly discussed above with respect to selection of the cluster level-route.

The adjacent cluster target node 25 will preferably be as close in distance to the source cluster 27, and have as a high a capacity, as is possible. Also, it should be noted that a cluster leader node of an adjacent cluster could also serve as a cluster target node as well, which may be particularly advantageous if the cluster leader node has high link capacities.

Various approaches are possible for establishing the cluster target nodes. For example, a proactive approach may be adopted in which each node 11 in each cluster 12 may use the above procedure to designate a cluster target node for each of the clusters adjacent to its own cluster. An adjacent cluster target node "hello" message may then be used to maintain node-level routes to such cluster target nodes. This message may be transmitted periodically to each adjacent cluster target node to ensure that the route is still available. The cluster target node may then reply with the same packet type to indicate that the route is still valid. If the route fails, then the failure is detected by this process and the node sending the adjacent cluster target node hello message may initiate a search for another adjacent cluster target node, as will be described further below.

Another approach that does not require the adjacent cluster target node hello message is to discover adjacent cluster target nodes only on a reactive basis when required. Further, these adjacent cluster target nodes may be maintained only as long as they are used. Here again, this will result in less network traffic, which may be advantageous in certain applications, as will be appreciated by those of skill in the art. In either case, by having each node independently select its adjacent cluster target nodes, there will likely not be one single cluster target node used for each cluster, which may reduce the concentration of transit traffic that may otherwise occur through such a single cluster target node. Of course, a single cluster target node could be used in some embodiments, if desired, as will also be appreciated by those of skill in the art.

Once the next cluster target node is determined (the node 17a in the example illustrated in FIG. 2), a node-level route to the next cluster target node may then be determined, at Block 62. This may be done by sending a node-level route request to the next cluster target node 17a using a base routing protocol such as DSR or AODV, for example. Specific embodiments of the present invention using these two protocols will be presented below.

Generally speaking, node-level route requests may be used to find routes to other nodes within the same cluster or to the cluster target nodes in adjacent clusters by using a limited broadcast (or expanding ring search). It should be noted that the destination node 15 could be in the same cluster as the source node 14. If this is the case, only a node-level route need be used, as cluster-level routes are needed only to reach destination nodes outside the source node cluster. This case will also be discussed further below in conjunction with the discussion of DSR as the base routing protocol.

Once the node-level route to the next cluster target node along the cluster-level route has been established, the data may then be transferred from the source node 14 to the next cluster target node 17a via the node-level route, at Block 63. Here again, this data transfer will be governed by the underlying base routing protocol that is being used. Generally speaking, the data will be transmitted along with a mission data packet or header which includes information that is pertinent to the node-level transfer, the cluster level route, or both. The use of mission data packets will also be discussed further below in the particular cases in which DSR and AODV are used as the based routing protocols.

The above described steps illustrated at Blocks 61–63 will then be repeated to determine each next cluster target node 17b, 17c, 17d, 17e, along the cluster-level route and the respective node-level routes therebetween until the data is transferred to the destination target node 17e, at Block 64. Once the data reaches the destination cluster target node 17e, a node-level route from the destination cluster target node to the destination node 15 may be determined (Block 65), and the data transferred therebetween via this node-level route (Block 66) as discussed above, thus ending the method, at Block 67. Again, these steps may be performed according to the base routing protocol, such as DSR or AODV, for example.

Figure 2:
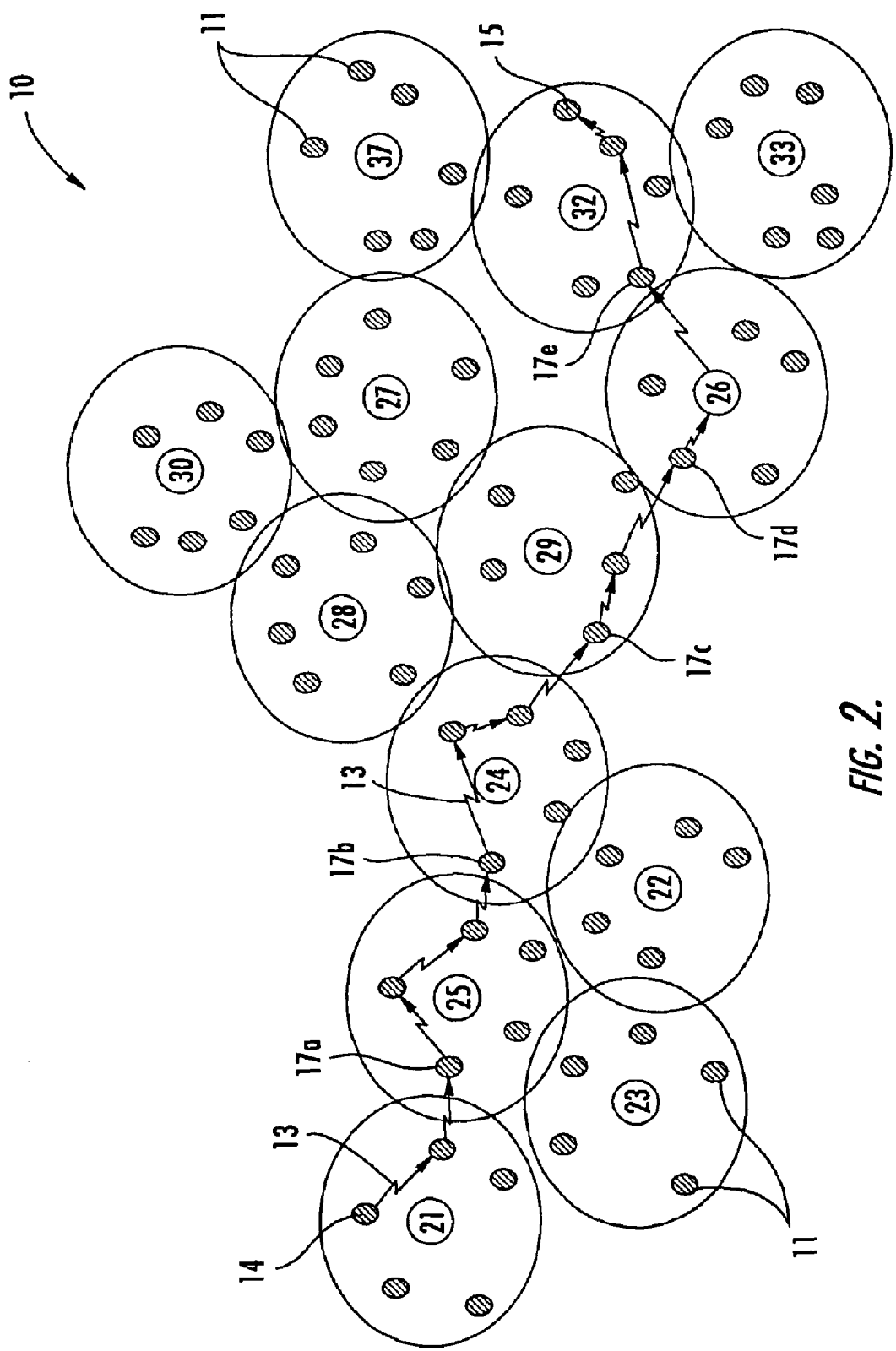
FIG. 2 is a schematic diagram of the ad-hoc network of FIG. 1 illustrating node-level routes therein along a cluster-level route.

As may be seen in FIG. 2, the various node-level routes along the cluster-level route may or may not include cluster leader nodes. In some embodiments, it may be particularly advantageous to define the node-level routes to not include cluster leader nodes where possible, as this may help alleviate excessive traffic at the cluster leader nodes. The node-level route discovery process could thus include using a metric for each potential route that signifies whether the route will include a cluster leader node, and the node requesting the route may then use this metric in its selection process, for example, as will be appreciated by those of skill in the art.

Figure 7:
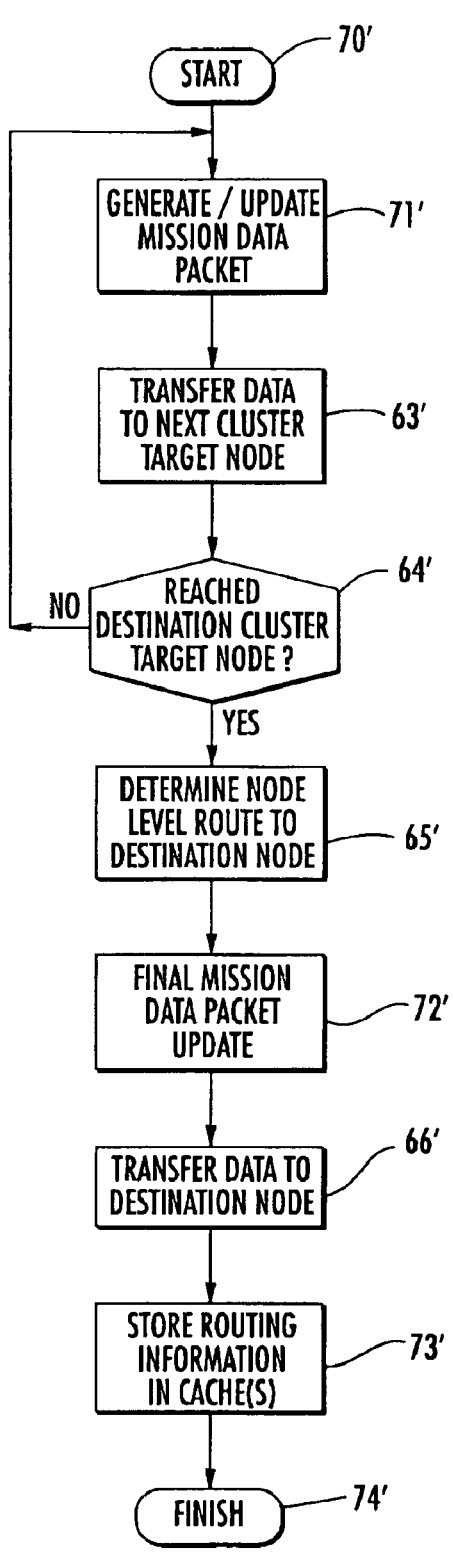
FIG. 7 is a flow diagram illustrating an alternate embodiment of the method of FIG. 5 using dynamic source routing (DSR).

The case in which DSR is to be used as the base routing protocol will now be described with reference to FIG. 7. The basic DSR protocol includes message types such as route requests and route replies, which may be used to perform the steps described with reference to Blocks 61 and 62 of FIG. 6, which are not reproduced in FIG. 7. It should be noted that the route discovery process for node-level routes in accordance with the invention is very similar to that of the conventional DSR approach. That is, a controlled broadcast search is used to search only in the current cluster or to search for routes to cluster target nodes (or cluster leader nodes) in the adjacent clusters, rather than over the entire network 10. The standard DSR packet type may be modified to accommodate a field for metric type and metric value if it is desired to use a path selection criteria other than minimum hop count, as discussed briefly above, which will be appreciated by those of skill in the art.

On the other hand, the cluster-level route discovery process according to the invention will vary somewhat from the conventional DSR approach. Namely, this process will involve a limited global search. This is because of the existence of the designated communication links 16 (and corresponding node-level source routes) between all adjacent cluster leader nodes 21–33. In other words, the route discovery packets will traverse only the designated communication links 16 rather than all links 13 in the network 10, as described above. The cluster leader node route request forwarded from one cluster leader node will preferably include the node-level source route to the next cluster leader node to which it is forwarding the message. Again, the message is forwarded in this fashion to the cluster leader nodes in all adjacent clusters.

As noted above, data transfer according to a base protocol usually requires that some form of mission data packet or header be generated to accompany the data. When using DSR in accordance with the invention, beginning at Block 70' the mission data packet generated by the source node 14 (Block 71') will preferably include an address of the destination node, an address of the next cluster target node 17a, the node-level route, and the cluster-level route. The next cluster target and cluster-level routing fields may be defined as optional packet types for application to the present invention, as will be understood by those skilled in the art.

This data is then transferred based upon the mission data packet along the node-level route to the next-cluster target node 17a, at Block 63'. The next cluster target node 17a' will then repeat the steps illustrated at Blocks 61 and 62 (FIG. 6) and then update the mission data packet accordingly. More particularly, the mission data packet is updated at each cluster target node 17a, 17b, 17c, 17d along the cluster-level route to include the new cluster target node and the new node-level route thereto.

This process continues until the destination cluster target node 17e is reached (Block 64'). The destination cluster node 17e determines that the data has reached the destination cluster 32 by the cluster-level route in the mission data packet. Then, the node-level route to the destination node 15 is determined (Block 65'). The mission data packet may then be updated to include null values for the cluster level route and the next cluster target node, since the route to the destination node 15 is an intracluster route. The data may then be transferred to the destination node 15, as previously described above, at Block 66'.

It was also noted above that the source node 14 and destination node 15 may, in some cases, be located in the same cluster. When this happens, the source node 14 may simply set the address of the cluster target node and the cluster-level route in the mission data packet to equal to a predetermined value. For example, this may be a null value as described above with respect to the destination cluster target node 17e. The conventional DSR routing procedures may then be used to transfer the data.

Again, the source node 14 will also not need to request a cluster-level route in such cases if it already knows that the destination node 15 is in the same cluster. This may be the case if data has previously been sent thereto and a record thereof has been stored in a memory or cache of the source node 14.

In this regard, the various routing information that has been determined in the above-described steps may advantageously be stored in one or more caches to be used for future routing operations, at Block 73', thus concluding the process (Block 74'). As a result, if such routing information has not timed out or otherwise been discarded, it may be used again without completing all or parts of the cluster/node-level discovery processes.

By way of example, the following types of caches may be maintained. A cluster-level route cache caches the cluster-level route to any destination cluster for which routes are currently being maintained. This cache may be kept at each of the cluster leader nodes 21–33, for example, and indexed by the destination cluster to provide known cluster-level source routes upon request.

Another cache may include a node-level route cache which caches the node-level route to any node in the same cluster or in adjacent clusters (such as the cluster target nodes 17) for which routes are currently being maintained. This cache may be kept at each individual node 11 and indexed by destination node address, and it provides each node 11 with a known node-level source route when available.

Moreover, a hierarchical route cache, which may be kept at each node 11, caches the hierarchical route to any destination node for which routes are currently being maintained. This cache may also be indexed by the destination node address, and the cache returns the hierarchical route which includes the cluster-level source route to the destination cluster and the node-level source route to the cluster target node (the node 17a in the illustrated example) in the first cluster on the source route.

Additional types of caches which may prove useful include a cluster cache which is a table that is indexed by the destination node address and which returns the address of the cluster in which the node currently is a member, as well as an adjacent cluster target node cache. This cache includes the adjacent cluster target node for each adjacent cluster. This cache may be indexed by the adjacent cluster address and returns the adjacent cluster node address for that cluster.

Given the dynamic nature of ad-hoc networks, various types of addresses may be used for the individual nodes and clusters. Depending upon the particular type of addressing used in a particular application, various other modifications may be necessary for a given base protocol. For example, if fixed addresses are used, then a protocol may be included for distributing current cluster membership as the nodes change clusters, as will be appreciated by those of skill in the art. If such a protocol is not used, then cluster membership can be determined in a reactive manner using the CLNRR route discovery process, for example. On the other hand, if addresses are dynamically assigned based upon the particular cluster, hierarchical level (discussed further below), etc., at which the node is located, then a dynamic name server may optionally be included for allowing a source node to determine the current address for a fixed node name, as will also be appreciated by those skilled in the art.

Turning now to the alternate embodiment in which AODV is used as the base routing protocol, this approach will be described with reference to the flow diagram of FIG. 8. According to the AODV protocol, node-level routes are established using route requests and route replies, as is the case with DSR described above. Yet, the manner in which node level routes, and correspondingly cluster-level routes, are determined is somewhat different than in DSR.

Figure 8:
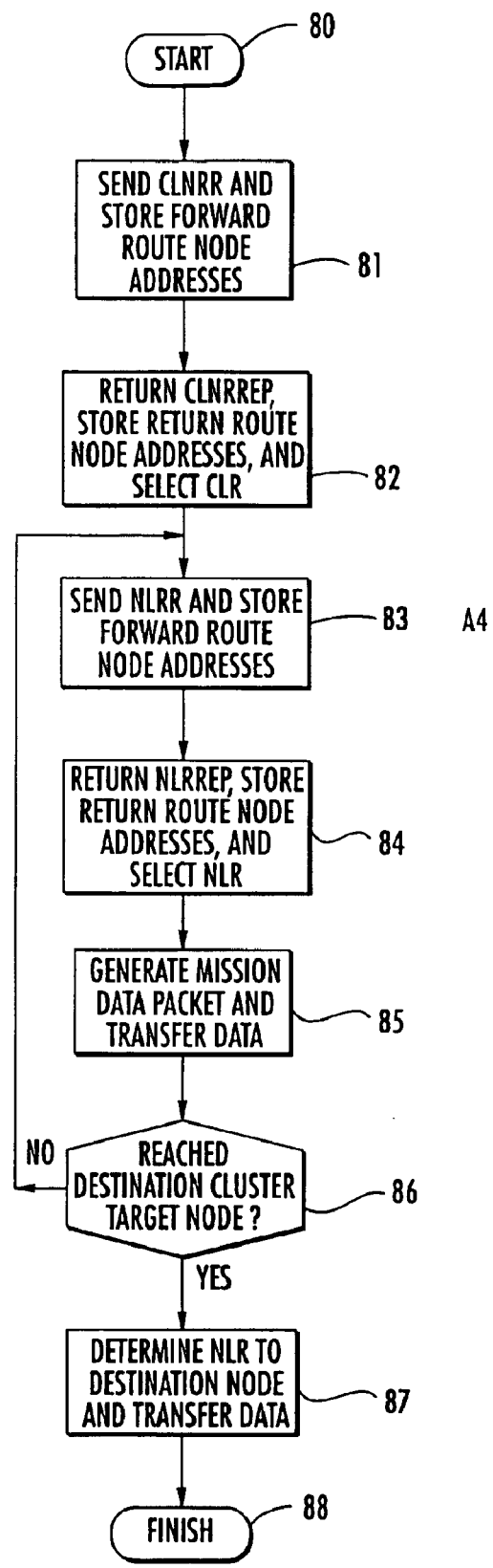
FIG. 8 is a flow diagram illustrating another alternate embodiment of the invention using ad-hoc on-demand vector (AODV) routing.

More particularly, beginning at Block 81 in FIG. 8, a cluster leader node route request is sent using conventional AODV mechanisms known to those skilled in the art via the designated communication links 16. Generally speaking, according to the AODV protocol, when a route request is sent each node 11 along a route stores the address of the prior node from which it received the route request, which is then forwarded along to the next node. In this way, if a route reply is ultimately returned along this route, then the address stored in each node 11 provides the location of the next hop along the return route. Further, as the route reply is forwarded from one node 11 to the next along the return route, each node then stores the address of the node which forwarded the route reply to it. These addresses then provide the location of the next hop along the route when the data is transmitted along the route.

According to the present invention, the above described process takes place at the cluster level to determine the cluster-level route, at Blocks 81–82, using the above referenced cluster leader node route requests and cluster leader node route replies. Moreover, this process is similarly implemented at the node level to determined the node-level routes along the cluster-level route, at Blocks 83–84, using the node-level route requests and node-level route replies described above. Here again, cluster target nodes may be used as described above, if desired, and the cluster target nodes may be determined as previously described above but with the standard mechanisms of AODV, as will be appreciated by those of skill in the art.

A mission data packet may be generated at the beginning of each node-level route (i.e., either by the source node 14 or a cluster target node 17) and the data may then be transferred along the various node-level routes thus defined based upon the mission data packets, at Block 85. In accordance with the AODV protocol, the mission data packet typically requires only the address of the destination node 15, as the hops of the node-level route are already stored in the various nodes 11 on the route.

Since the mission data packet may not include the location of the next cluster along the cluster level route, each cluster target node 17 may poll its respective cluster leader node for the next cluster address. The cluster leader node may then determine the next cluster target node based upon the next cluster address. Of course, other approaches may be used in which optional data packets are defined for inclusion in the mission data packet so that the cluster leader nodes need not be polled, as will be understood by those of skill in the art.

The data is transferred along the various node-level routes until reaching the destination cluster target node 17e, at Block 86. The node-level route to the destination node 15 may then be defined, again using standard AODV techniques, and the data transferred thereto, at Block 87, thus concluding the process (Block 88).

Various tables may be used for storing the requisite routing information for implementing AODV in accordance with the present invention. In particular, a cluster-level route table, which may be indexed by the destination cluster address, returns the next adjacent cluster on the path to any destination cluster for which routes are being maintained. Further, a node-level route table, which again may be indexed by the destination node address, returns the address of the next node 11 on the path to any node in the same cluster or in adjacent clusters (such as the cluster target nodes 17) for which routes are being maintained.

Moreover, a cluster cache, which may be indexed by the destination node address, returns the address of the cluster in which the destination node is currently a member. An adjacent cluster target node cache, which may be indexed by the adjacent cluster address, returns the adjacent cluster target node address for adjacent clusters. In addition, a hierarchical route table, which may be indexed by the destination node address, returns the address of the next node on the path to any destination node in the entire network for which routes are being maintained.

As similarly described above, the data maintained in the above tables may be stored each time new cluster-level or node-level information is gathered. Thus, this information will be available for future routes, which helps alleviate traffic as discovery request and reply messages may be avoided. Of course, this information may also be discarded after a period of time, for example, to reduce the storage of outdated information.

Figure 9:
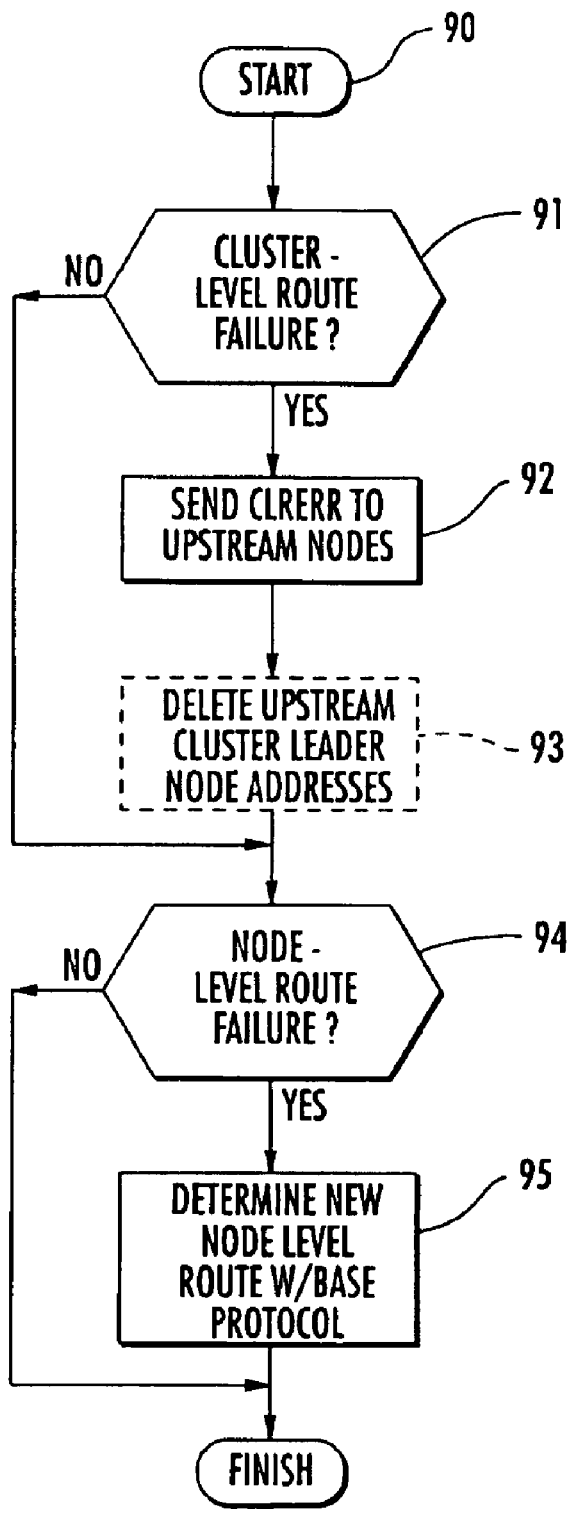
FIG. 9 is a flow diagram illustrating a method for route error recovery according to the present invention.

Due to the dynamic nature of wireless mobile ad-hoc networks, a common problem which must be addressed is that of route failure due to nodes 11 logging off of the network 10, breaks in the wireless communication links 16, etc. Base routing protocols typically include mechanisms for addressing route recognition and repair. Route repair in the context of the present invention, with particular emphasis on route repair using the DSR and AODV protocols, will now be described further with respect to the flow diagram of FIG. 9. For the purposes of FIG. 9, it will be assumed that the cluster-level and node-level route designation processes (FIGS. 5 and 6) have previously been performed.

As such, beginning at Block 90, if a cluster-level route failure occurs between adjacent clusters along the cluster-level route, at Block 91, a cluster-level route error message is sent (Block 92) to the source node 14, which will then begin the cluster-level and node-level route discovery processes over again, as previously described above. The form that this particular route request takes will depend upon the base routing protocol being used.

For example, if the base protocol being used is AODV, it will be recalled that each of the cluster leader nodes stores the address of each "downstream" cluster leader node along the cluster-level route to the destination cluster leader node 32. As such, as the cluster-level route error message traverses the cluster-level route back "upstream" to the cluster-level route, each of the cluster leader nodes receiving the error message may delete the next hop address from its respective cache, at Block 93, since the cluster-level route is no longer valid.

For the case in which DSR is used as the base protocol, the cluster-level route error message may be broadcast from the cluster leader node discovering the loss of connection to all other nodes within its cluster as well as the cluster leader nodes in all adjacent clusters. This broadcast will reach all nodes that have been selected as adjacent cluster target nodes 17 by nodes in other clusters as well as all other nodes within the cluster. Any adjacent cluster target node 17 that receives a packet to forward through the cluster that is no longer adjacent will now forward a cluster-level route error message to the original sender of the data packet notifying it that the route has failed at the cluster level. The cluster-level route error message broadcast to the cluster leader nodes in all adjacent clusters may also be broadcast to all cluster leader nodes in the network 10, if desired, thereby informing them that cluster-level routes may be outdated. This prompts all of the cluster leader nodes to initiate a new round of route discovery queries upon receiving new cluster-level route requests, rather than simply relying of information previously stored in their respective caches.

On the other hand, if a node-level route failure occurs between adjacent nodes in a node-level route, at Block 94, then a new node-level route may be determined in accordance with the base protocol being used, at Block 95, thus concluding the process (Block 96). More particularly, for a node-level route used to a destination node 15 or to adjacent cluster target nodes 17, the basic procedures established for the base routing protocol using a route error message will accommodate notification of the appropriate nodes of the path failure, as will be appreciated by those of skill in the art.

Figure 3:
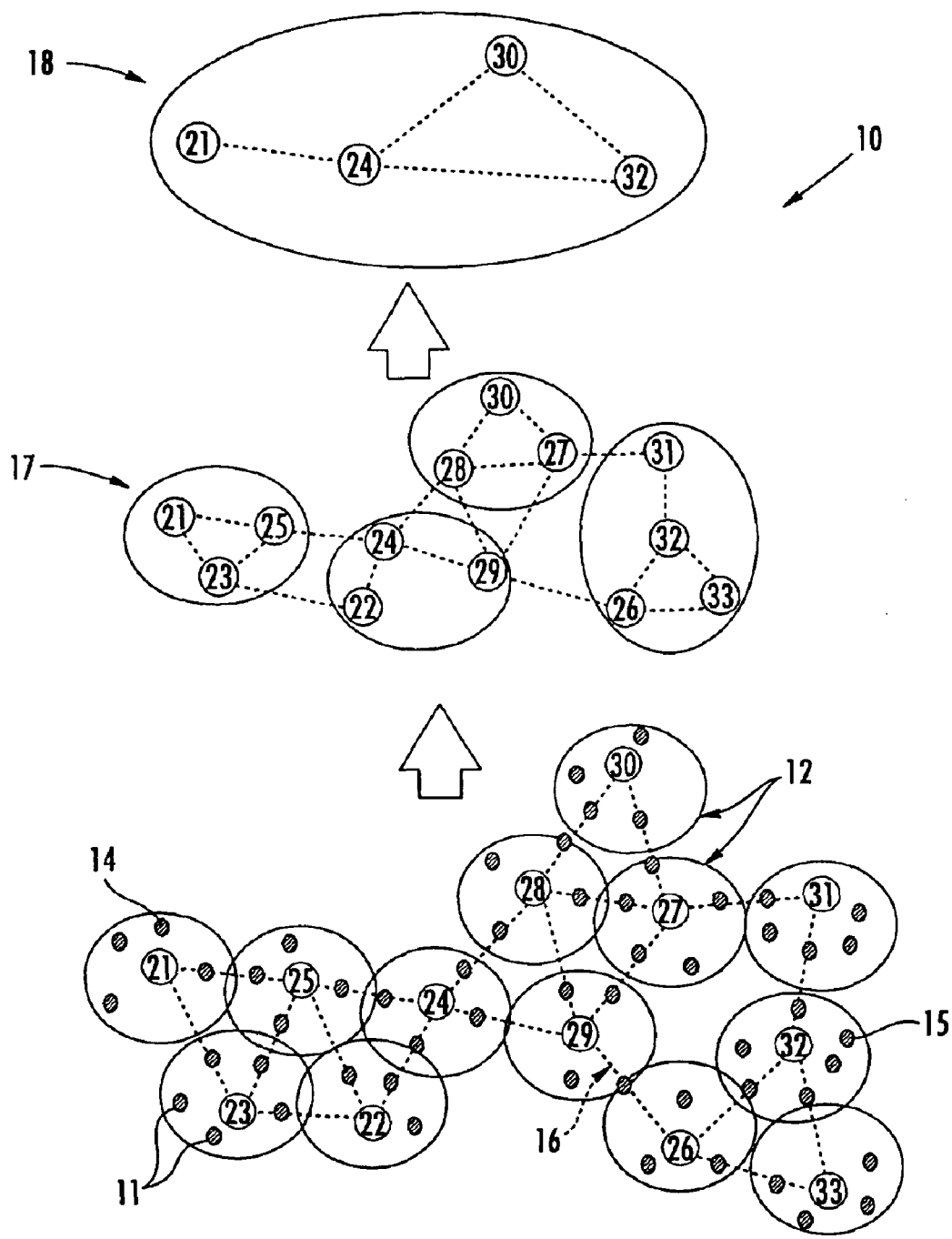
FIG. 3 is a schematic diagram of the ad-hoc network of FIG. 1 illustrating multiple hierarchical levels.

The above-described method of the present invention may also advantageously be extended to an arbitrary number of hierarchical levels, as illustrated in FIG. 3. In FIG. 3, the exemplary ad-hoc network 10 illustrated in FIGS. 1 and 2 has been extended to four levels of hierarchy. The first level of the hierarchy is the network node level (i.e., the nodes 11) from the previous example. The second level is made up of the hierarchy includes the clusters 12.

The third level 17 of the hierarchy is constructed from virtual nodes and virtual links. Each virtual node at the third level represents an entire cluster 12 at the second level. Closely connected virtual nodes at the third level 17 are grouped into third level clusters, and one of these virtual nodes is selected as the third level virtual cluster leader node. The physical node selected as the third level 17 cluster leader node may be the actual cluster leader node from the second level cluster, which would then perform the cluster leader node functions for both the second and third level clusters.

Figure 10:
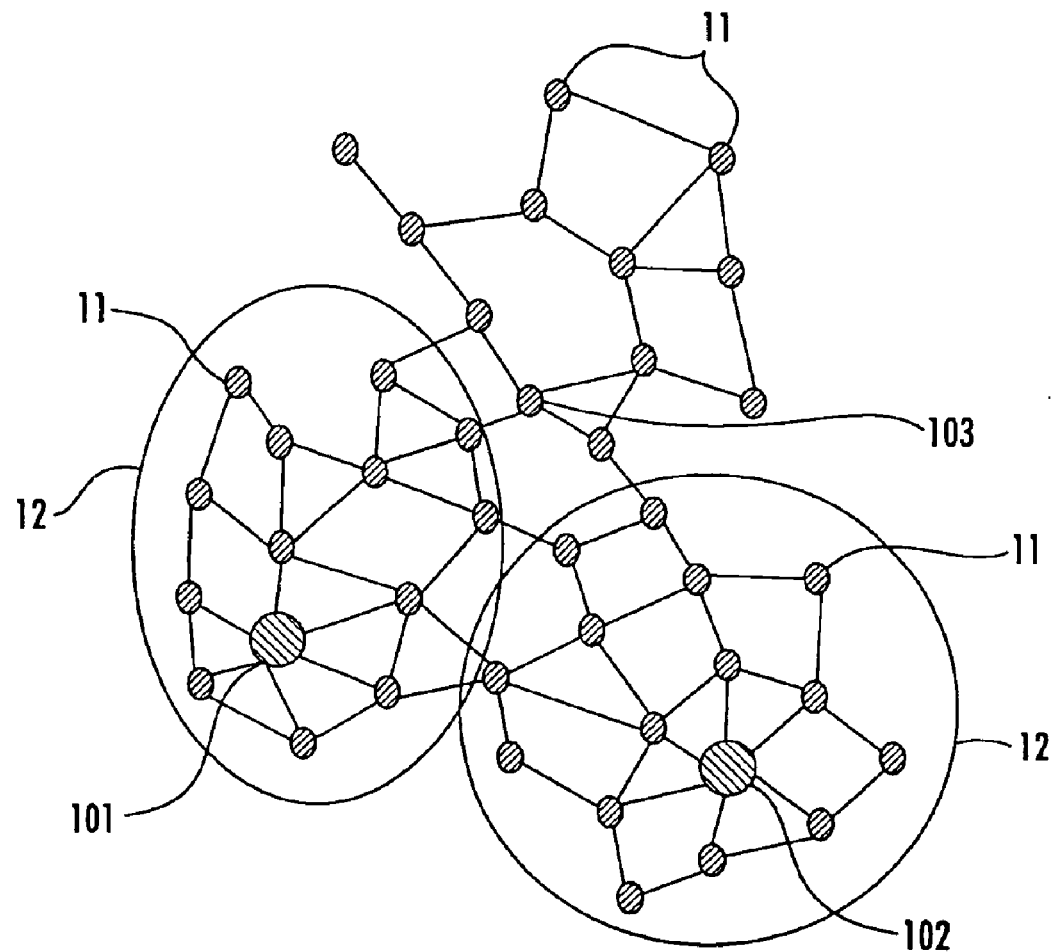
FIG. 10 is schematic diagram illustrating grouping of clusters and cluster leader node designation in accordance with the present invention.

The third level 17 virtual links illustratively shown with dashed lines in FIG. 10 are the multi-hop virtual links between the cluster leader nodes in adjacent clusters shown at the second level. Virtual links between third level 17 cluster leader nodes may also be established, as also illustratively shown with dashed lines. This hierarchical organizational process can be continued to any number of levels, as will be appreciated by those skilled in the art.

A fourth level 18 cluster is also illustratively shown in FIG. 3, in which each third level 17 cluster becomes a virtual node in the fourth level. The virtual links shown at the fourth level 18 are the third level 17 cluster leader node virtual links. The physical node selected as the fourth level 18 cluster leader node may be the actual cluster leader node from the third level 17 cluster, which would perform the cluster leader node functions for the second, third, and fourth level clusters. If the network were larger, the hierarchical organization could be extended to even more clusters, as will be appreciated by those of skill in the art.

Several of the above-described messages may be augmented to handle an arbitrary number of hierarchical levels. For example, the cluster leader node route request message type may be of a different type for each hierarchical cluster level. This message is broadcast to all destination cluster leader nodes, but it is sent over the virtual links connecting all cluster leader nodes at the appropriate hierarchical level, which involves only uni-casts over the virtual links connecting adjacent cluster leader nodes. Moreover, the cluster leader node route reply message, like the cluster leader node route request, will similarly have different types for each hierarchical cluster level, as will be appreciated by those of skill in the art.

Furthermore, the cluster-level route request may have a different type for each hierarchical cluster level. More particularly, at a specific level the message is sent to the ALN for that level. Additionally, with respect to the cluster-level route reply, the source node can obtain the cluster-level route (for the specific hierarchical level of the request) to the destination with a transaction that is sent over a short distance to its cluster leader node.

As may be seen in FIG. 3, the fourth level 18 includes a single cluster which may advantageously provide a convenient reference for determining a high-level route from the cluster leader node 21 of the source cluster to the cluster leader node 32 of the destination cluster. More particularly, since this single cluster includes the source and destination leader node clusters 21, 32, the high-level route may be determined therebetween using the various steps outlined above. The high-level route may, in turn, be used to determine the cluster-level route for the second hierarchical level. That is, the cluster-level route may include at least the clusters having respective cluster leader nodes along the high-level route, here the cluster leader nodes 21, 24, and 32.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for sending data in a wireless ad-hoc network comprising a plurality of nodes grouped into clusters of nodes and a plurality of wireless links connecting the plurality of nodes, each cluster having a designated cluster leader node, the method comprising:

sending a cluster-level route request from a source node of a source cluster to a cluster leader node of the source cluster;

determining a cluster-level route between the source cluster and a destination cluster comprising a destination node responsive to the cluster-level route request and using a plurality of the cluster leader nodes;

designating at least one cluster target node in a cluster along the cluster-level route;

determining a node-level route from the source node to the destination node including the at least one cluster target node;

generating a mission data packet comprising an address of the destination node, an address of the at least one cluster target node, the node-level route, and the cluster-level route; and transferring data from the source node to the destination node via the node-level route based upon the mission data packet.

2. The method of claim 1 wherein determining the at least one cluster target node comprises determining a respective cluster target node for each cluster along the cluster-level route.

3. The method of claim 2 wherein determining the node-level route comprises determining the node-level route from the source node to a cluster target node for a next adjacent cluster along the cluster-level route; and further comprising determining a node-level route from each cluster target node to a next cluster target node along the cluster-level route.

4. The method of claim 3 wherein generating the mission data packet further comprises updating the mission data packet at each cluster target node along the cluster-level route to comprise an address of the next cluster target node and the node-level route thereto.

5. The method of claim 1 wherein the address of the at least one cluster target node and the cluster-level route are equal to a predetermined value if the source cluster and the destination cluster are the same cluster.

6. The method of claim 1 further comprising storing the address of the destination node along with an address of the respective cluster leader node therefor at the cluster leader node for the source cluster.

7. The method of claim 1 further comprising storing, at the source node, a hierarchical source route to the destination node comprising the cluster-level route, the address of the at least one cluster target node, and the node-level route.

8. The method of claim 1 further comprising storing the cluster-level route at the cluster leader node for the source cluster.

9. The method of claim 1 further comprising grouping a plurality of the cluster leader nodes comprising at least the source cluster leader node and the destination cluster leader node into a leader node cluster, and determining a high-level route from the cluster leader node of the source cluster to the cluster leader node of the destination cluster within the leader node cluster; and wherein the cluster-level route comprises at least the clusters having respective cluster leader nodes along the high-level route.

10. The method of claim 1 wherein determining the cluster-level route comprises:

determining designated communication links between the cluster leader nodes;

sending a cluster leader node route request from the cluster leader node of the source cluster to the remaining cluster leaders via the designated communication links; and returning a cluster leader node route reply from the cluster leader node of the destination cluster to the cluster leader node of the source cluster along a delivery route of the cluster leader node route request.

11. The method of claim 10 wherein at least one of the designated communications links comprises a node that is not a cluster leader node.

12. The method of claim 10 wherein each cluster leader node stores identities of adjacent cluster leader nodes; and wherein sending the cluster leader node route request comprises sending the cluster leader node route request from each cluster leader node to its adjacent cluster leader nodes.

13. The method of claim 12 further comprising periodically polling the adjacent cluster leader nodes to maintain current addresses therefor.

14. The method of claim 10 wherein the delivery route comprises a least number of cluster leader nodes between the cluster leader nodes of the source and destination clusters.

15. The method of claim 10 further comprising determining the delivery route based upon at least one of delay, link capacity, and availability.

16. A method for sending data in a wireless ad-hoc network comprising a plurality of nodes grouped into clusters of nodes and a plurality of wireless links connecting the plurality of nodes, each cluster having a designated cluster leader node, the method comprising:

sending a cluster-level route request from a source node of a source cluster to a cluster leader node of the source cluster;

determining a cluster-level route between the source cluster and a destination cluster comprising a destination node responsive to the cluster-level route request and using a plurality of the cluster leader nodes;

designating at least one cluster target node in a cluster along the cluster-level route;

determining a node-level route from the source node to the destination node including the at least one cluster target node;

generating a mission data packet comprising an address of the destination node, an address of the at least one cluster target node, the node-level route, and the cluster-level route, the address of the at least one cluster target node and the cluster-level route being equal to a predetermined value if the source cluster and the destination cluster are the same cluster;

transferring data from the source node to the destination node via the node-level route based upon the mission data packet; and storing, at the source node, a hierarchical source route to the destination node comprising the cluster-level route, the address of the at least one cluster target node, and the node-level route.

17. The method of claim 16 wherein determining the at least one cluster target node comprises determining a respective cluster target node for each cluster along the cluster-level route.

18. The method of claim 17 wherein determining the node-level route comprises determining the node-level route from the source node to a cluster target node for a next adjacent cluster along the cluster-level route; and further comprising determining a node-level route from each cluster target node to a next cluster target node along the cluster-level route.

19. The method of claim 18 wherein generating the mission data packet further comprises updating the mission data packet at each cluster target node along the cluster-level route to comprise an address of the next cluster target node and the node-level route thereto.

20. The method of claim 16 further comprising storing the address of the destination node along with an address of the respective cluster leader node therefor at the cluster leader node for the source cluster.

21. The method of claim 16 further comprising storing the cluster-level route at the cluster leader node for the source cluster.

22. The method of claim 16 further comprising grouping a plurality of the cluster leader nodes comprising at least the source cluster leader node and the destination cluster leader node into a leader node cluster, and determining a high-level route from the cluster leader node of the source cluster to the cluster leader node of the destination cluster within the leader node cluster; and wherein the cluster-level route comprises at least the clusters having respective cluster leader nodes along the high-level route.

23. The method of claim 16 wherein determining the cluster-level route comprises:

determining designated communication links between the cluster leader nodes;

sending a cluster leader node route request from the cluster leader node of the source cluster to the remaining cluster leaders via the designated communication links; and returning a cluster leader node route reply from the cluster leader node of the destination cluster to the cluster leader node of the source cluster along a delivery route of the cluster leader node route request.

24. The method of claim 23 wherein at least one of the designated communications links comprises a node that is not a cluster leader node.

25. The method of claim 23 wherein each cluster leader node stores identities of adjacent cluster leader nodes; and wherein sending the cluster leader node route request comprises sending the cluster leader node route request from each cluster leader node to its adjacent cluster leader nodes.

26. The method of claim 25 further comprising periodically polling the adjacent cluster leader nodes to maintain current addresses therefor.

27. The method of claim 23 wherein the delivery route comprises a least number of cluster leader nodes between the cluster leader nodes of the source and destination clusters.

28. The method of claim 23 further comprising determining the delivery route based upon at least one of delay, link capacity, and availability.

29. A wireless ad-hoc network comprising:

a plurality of nodes grouped into clusters of nodes, each cluster node having a designated cluster leader node; and a plurality of wireless links connecting said plurality of nodes;

said plurality of nodes sending data therebetween by sending a cluster-level route request from a source node of a source cluster to a cluster leader node of said source cluster;

determining a cluster-level route between said source cluster and a destination cluster comprising a destination node responsive to the cluster-level route request and using a plurality of said cluster leader nodes;

designating at least one cluster target node in a cluster along the cluster-level route;

determining a node-level route from said source node to said destination node including said at least one cluster target node;

generating a mission data packet comprising an address of said destination node, an address of said at least one cluster target node, the node-level route, and the cluster-level route; and transferring data from said source node to said destination node via the node-level route based upon the mission data packet.

30. The mobile ad-hoc network of claim 29 wherein said at least one cluster target node comprises a respective cluster target node for each cluster along the cluster-level route.

31. The mobile ad-hoc network of claim 30 wherein the node-level route comprises a node-level route from the source node to a cluster target node for a next adjacent cluster along the cluster-level route and a node-level route from each cluster target node to a next cluster target node along the cluster-level route.

32. The mobile ad-hoc network of claim 31 wherein the mission data packet is updated at each cluster target node along the cluster-level route to comprise an address of the next cluster target node and the node-level route thereto.

33. The mobile ad-hoc network of claim 29 wherein the address of the at least one cluster target node and the cluster-level route are equal to a predetermined value if the source cluster and the destination cluster are the same cluster.

34. The mobile ad-hoc network of claim 29 wherein the address of the destination node is stored along with an address of the respective cluster leader node therefor at the cluster leader node for the source cluster.

35. The mobile ad-hoc network of claim 29 wherein, at the source node, a hierarchical source route to the destination node is stored comprising the cluster-level route, the address of the at least one cluster target node, and the node-level route.

36. The mobile ad-hoc network of claim 29 wherein the cluster-level route is stored at the cluster leader node for the source cluster.

37. The mobile ad-hoc network of claim 29 further comprising designated communication links connecting the cluster leader nodes; and wherein the cluster level route is determined by sending a cluster leader node route request from said cluster leader node of said source cluster to said remaining cluster leaders via said designated communication links, and returning a cluster leader node route reply from said cluster leader node of said destination cluster to said cluster leader node of said source cluster along a delivery route of the cluster leader node route request.

38. The mobile ad-hoc network of claim 37 wherein at least one of said designated communications links comprises a node that is not a cluster leader node.

39. The mobile ad-hoc network of claim 37 wherein each cluster leader node stores identities of adjacent cluster leader nodes; and wherein the cluster leader node route request is sent from each cluster leader node to its adjacent cluster leader nodes.

40. The mobile ad-hoc network of claim 39 wherein each cluster leader node periodically polls its adjacent cluster leader nodes to maintain current addresses therefor.

41. The mobile ad-hoc network of claim 37 wherein the delivery route comprises a least number of cluster leader nodes between said cluster leader nodes of said source and destination clusters.

* * * * *

UNITED STATES PATENT AND TRADEMARK OFFICE
CERTIFICATE OF CORRECTION

PATENT NO. : 6,870,846 B2
DATED : March 22, 2005
INVENTOR(S) : Cain

It is certified that error appears in the above-identified patent and that said Letters Patent is hereby corrected as shown below:

Column 2,
Line 2, delete "1997. this" insert -- 1997. This --

Column 4,
Line 48, delete "beings" insert -- begins --

Column 8,
Line 12, delete "aarded" insert -- awarded --
Line 64, delete "then" insert -- than --

Column 9,
Line 11, delete "21-23" insert -- 21-33 --

Column 11,
Line 39, delete "has includes" insert -- includes --

Column 18,
Line 4, delete "relying of" insert -- relying on --

Signed and Sealed this

Second Day of August, 2005

JON W. DUDAS
*Director of the United States Patent and Trademark Office*